United States Patent
Hirosaki et al.

(10) Patent No.: US 8,003,011 B2
(45) Date of Patent: *Aug. 23, 2011

(54) β TYPE SIALON FLUORESCENT SUBSTANCE

(75) Inventors: Naoto Hirosaki, Tsukuba (JP); Hideyuki Emoto, Machida (JP); Masahiro Ibukiyama, Machida (JP)

(73) Assignees: National Institute for Materials Science, Tsukuba-shi (JP); Denki Kagaku Kogyo Kabushiki Kaisha, Tokyo (JP)

( * ) Notice: Subject to any disclaimer, the term of this patent is extended or adjusted under 35 U.S.C. 154(b) by 746 days.

This patent is subject to a terminal disclaimer.

(21) Appl. No.: 11/914,272

(22) PCT Filed: May 10, 2006

(86) PCT No.: PCT/JP2006/309409
§ 371 (c)(1),
(2), (4) Date: Nov. 13, 2007

(87) PCT Pub. No.: WO2006/121083
PCT Pub. Date: Nov. 16, 2006

(65) Prior Publication Data
US 2009/0050845 A1 Feb. 26, 2009

(30) Foreign Application Priority Data
May 12, 2005 (JP) .................................. 2005-140449

(51) Int. Cl.
C09K 11/64 (2006.01)

(52) U.S. Cl. ................................................. 252/301.4 F
(58) Field of Classification Search ............. 252/301.4 F
See application file for complete search history.

(56) References Cited

U.S. PATENT DOCUMENTS
7,544,310 B2 * 6/2009 Hirosaki ................ 252/301.4 F
2003/0168643 A1 9/2003 Mitomo et al.

FOREIGN PATENT DOCUMENTS
| EP | 155047 A1 | 9/1985 |
| JP | 2002-363554 A | 12/2002 |
| JP | 2004-244560 A | 9/2004 |
| JP | 2005-255895 | * 9/2005 |
| JP | 2006-8721 A | 1/2006 |
| WO | WO 2005/087896 | * 9/2005 |

OTHER PUBLICATIONS
Hoppe et al. "Luminescence in Eu2+ -Doped Ba2Si5N8: Fluorscence, Thermoluminescence, and Upconversion", Journal of Physics and Chemistry of Solids 61, 2000, p. 2001.

* cited by examiner

*Primary Examiner* — Carol M Koslow
(74) *Attorney, Agent, or Firm* — Westerman, Hattori, Daniels & Adrian, LLP

(57) ABSTRACT

A β type Sialon fluorescent substance is disclosed that is capable of achieving enhanced brightness of a white light emitting diode using blue to ultraviolet light as a light source. In the fluorescent substance which contains not less than 90% by mass of a β type Sialon composition represented by general formula: $Si_{6-z}Al_zO_zN_{8-z}$ as a host material wherein z is not less than 0.24 and not more than 0.42, Eu is present dissolved in solid solution as a luminescent center at a content of 0.05 to 0.2% by atom. The β type Sialon fluorescent substance is preferably in the form of a powder having an average particle size of not less than 1 μm and not more than 20 μm. A white LED of good luminescent characteristics can be obtained by using a blue or ultraviolet light emitting diode as a excitation light source in combination with a fluorescent substance that emits yellow or red light.

9 Claims, 1 Drawing Sheet

β TYPE SIALON FLUORESCENT SUBSTANCE

TECHNICAL FIELD

The present invention relates to a β type Sialon (SiAlON) fluorescent substance that can be utilized, among others, as a phosphor for a white light emitting diode which uses a blue or ultraviolet light emitting diode as its light source.

BACKGROUND ART

A fluorescent substance comprising silicate, phosphate, aluminate or sulfide as a host material and containing a transition metal or a rare earth metal as a luminescent center is widely known.

Such fluorescent substances have attracted attention as a phosphor for LEDs emitting a visible light radiation such as white light and their development has moved on. An LED has its phosphor excited by a source of excitation high in energy such as ultraviolet or blue light to emit a visible light radiation.

These conventional fluorescent substances have the problem, however, that as a result of being exposed to the excitation source, they have had their brightness dropped, and a fluorescent substance that is less in brightness drop is being sought.

Accordingly, attention has recently been riveted to nitride or oxy-nitride fluorescent substances as a material that is stable in crystallographic structure and that allows shifting the excitation or emission light towards the longer wavelength side, among which Sialon fluorescent substances have focuses the spotlight of attention.

An α type Sialon doped with Eu ions can be excited by a wavelength in a broad range of ultraviolet to blue light to emit yellow light of 550 to 600 nm, and its utilization as a phosphor useful for a white LED in combination with a blue LED is being investigated (see Patent Reference 1).

In Sialon compositions, there is also a β type Sialon in which Si and N positions in β type silicon nitride are substituted with Al and O dissolving in solid solution, respectively. Patent Reference 2 discloses a fluorescent substances having rare-earth elements added to a β type Sialon and shows that those doped with Tb, Yb and Ag become green light phosphors of 525 nm to 545 nm. Patent Reference 3 discloses a red light phosphor having a base crystal of $CaSiAlN_3$. Nonpatent Reference 1 reports a red light phosphor having $Ca_2Si_5N_8$ as its base crystal.

REFERENCES CITED

[Patent Reference 1] Japanese Patent Laid Open Application No. JP 2002-363554 A
[Patent Reference 2] Japanese Patent Laid Open Application No. JP S60-206889 A
[Patent Reference 3] Japanese Patent Laid Open Application No. JP 2006-008721 A
[Nonpatent Reference 1] H. A. Hoppe and four others, "Luminescence in $Eu^{2+}$-doped $Ba_2Si_5N_8$: fluorescence, thermo-luminescence, and upconversion", Journal of Physics and Chemistry of Solids, Vol. 61, pp. 2001-2006, 2000

DISCLOSURE OF THE INVENTION

Problems to be Solved by the Invention

The technique of Patent Reference 2 has the problem that at a low synthesis temperature of 1500° C., doping atoms are not sufficiently dissolved in solid solution into the crystal structure to obtain a fluorescent substance of enough brightness.

As a result of investigations by the present inventors, it has recently been found that a β type Sialon synthesized at a temperature as high as 1820 to 2200° C. so that Eu ions are sufficiently dissolved in solid solution into the crystal structure can be excited with ultraviolet to blue light, exhibiting emission of green to yellow light of 500-550 nm (see Japanese Patent Application No. JP 2004-70894). However, the luminescence being very sensitive to the composition of a solid solution, the range of composition in which to realize enough brightness was uncertain and a β type Sialon fluorescent substance practically reproducible failed to be obtained.

In view of the problems mentioned above, it is an object of the present invention to provide a β type Sialon fluorescent substance that can realize enhanced brightness of a white light emitting diode (white LED) using as a light source blue or ultraviolet light emitted from a blue light emitting diode (blue LED) or ultraviolet emitting diode (ultraviolet LED).

Means for Solving the Problems

After conducting investigations on Eu containing β type Sialon fluorescent substances, the present inventors have acquired the knowledge that even slight differences in the content of Eu in solid solution into and the composition of β type Sialon largely affect the luminescence property and have great influences on sintering synthesized particles together, after all that selecting the composition of β type Sialon and the content of Eu in solid solution into β type Sialon composition in certain ranges gives rise to a β type Sialon fluorescent substance which is excellent in luminescence property and can be powdered by crushing into particles favorable in particle size.

In order to achieve the object mentioned above, there is provided in accordance with the present invention a β type Sialon fluorescent substance comprising a β type Sialon composition represented by:

$$Si_{6-z}Al_zO_zN_{8-z} \quad \text{general formula}$$

as a host material in which Eu is contained dissolved in solid solution as a luminescent center, characterized in that z in the composition of the general formula is not less than 0.24 and not more than 0.42 and Eu is present at a content of 0.05% to 0.25% by atom.

In the makeup mentioned above, the β type Sialon fluorescent substance preferably contains at least 90% by mass or more of the β type Sialon composition containing Eu dissolved in solid solution and preferably is in the form of a powder having an average particle size of not less than 1 μm and not more than 20 μm.

According to the makeup mentioned above requiring that z in the composition of the general formula: $Si_{6-z}Al_zO_zN_{8-z}$ be not less than 0.24 and not more than 0.42 and that Eu be present at a content of 0.05 to 0.25% by atom, a fluorescent substance can be obtained having a broad range of excitation sources from ultraviolet and visible light and emitting green light having a peak at a wavelength in a range not less than 500 nm and not more than 550 nm. This fluorescent substance can be used in combination with a fluorescent substance using blue or ultraviolet light as an excitation light source to emit yellow light for suitable use to form a white LED using blue or ultraviolet light as a light source.

Effects of the Invention

Having a broad excitation range from ultraviolet to visible light, a β type Sialon fluorescent substance according to the present invention can assume green color emission having a peak at a wavelength in a range not less than 500 nm and not more than 550 nm. Consequently, the β type Sialon fluorescent substance of the present invention can use a blue or ultraviolet LED in combination with a fluorescent substance emitting yellow light to realize a white LED that is favorable in luminescent property.

BEST MODES FOR CARRYING OUT THE INVENTION

Figure 1:
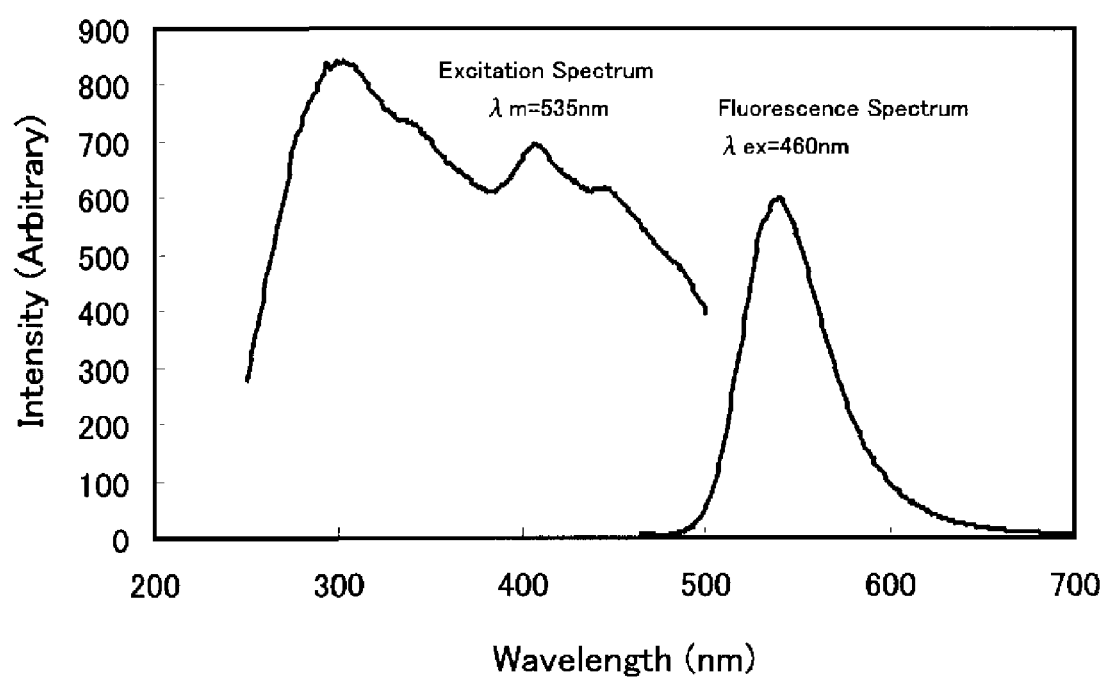
FIG. 1 is a diagram illustrating an excitation spectrum when a fluorescent intensity at 535 nm was measured of a type Sialon powder and an emission spectrum by external excitation light at a wavelength of 460 nm in Example 1.

Hereinafter, forms of implementation of the present invention are described in detail with reference to the Drawing FIGURE.

At the outset, mention is made of a β type Sialon fluorescent substance according to the present invention.

The β type Sialon is one in which Si and N positions in β type silicon nitride are substituted with Al and O, respectively, in solid solution. Since there are two formula weight atoms in a unit cell, general formula:

$$Si_{6-z}Al_zO_zN_{8-z}$$

is used.

Here, composition z is 0 to 4.2 and the range of solid solution is very wide. It is also essential that molar ratio (Si, Al)/(N, O) be maintained at 3/4. Accordingly, it is in general that as raw materials besides $Si_3N_4$, $SiO_2$ and AlN or $Al_2O_3$ and AlN are added and heated to obtain a β type Sialon.

In a β type Sialon fluorescent substance according to the present invention, the easiness for Eu to dissolve in solid solution is closely related to the z value, and the z value is preferably chosen to be 0.24 to 0.42. If the z value is less than 0.24, then it is undesirably difficult to dissolve in solid solution an amount of Eu required to obtain enough brightness. If it is converted to lattice constants of β type Sialon, the lattice constants a and b and the lattice constant c are preferably not less than 7.607 Å (0.7607 nm) and not less than 2.910 Å (0.2910 nm), respectively. This is considered to be due to the fact that increasing the z value increases the crystal lattice size (lattice constants), making Eu easy to dissolve in solid solution.

If the z value is more than 0.42, an attempt to obtain such β type Sialon requires increasing the amount of $SiO_2$ or $Al_2O_3$ in the raw materials, but such a compound forms its liquid phase at a temperature lower than its synthesis temperature to accelerate the interparticle sintering and cannot completely dissolve in solid solution into the β type Sialon crystal but its particles in part tend to firmly bond together forming the grain boundary phase. Since also the particles with an increase in their aspect ratio go on to intertwine, excessive pulverization is undesirably needed in order to obtain a β type Sialon fluorescent substance of a desired grain size from the β type Sialon obtained.

Furthermore, an increase in the amount of $SiO_2$ or $Al_2O_3$ undesirably impedes Eu from dissolving in solid solution into β type Sialon since they tend to react with $Eu_2O_3$ as the Eu raw material to form stable compounds in the process on the way of synthesis.

The Eu content in a β type Sialon fluorescent substance of the present invention is preferably in a range between 0.05 to 0.25% by atom. While it is not as yet certain how Eu exists in β type Sialon, it is considered that Eu is dissolved in solid solution in the β type Sialon crystal structure since it acts as a luminescent center.

The investigations by the present inventors indicate that if the Eu content is less than 0.05% by atom, a reduced number of luminescent centers lowers the luminous brightness to an unsatisfactory level, and if it is more than 0.25% atom, the luminous brightness is lowered, too. That this phenomenon is shown if the Eu content is too high is considered to be due to the fact that interference among Eu ions in solid solution brings about concentration quenching and that α type Sialon tends to be secondarily produced which is low in luminous brightness and in which Eu is densely dissolved in solid solution.

A β type Sialon fluorescent substance according to the present invention from the standpoint of fluorescence emission should desirably include the β type Sialon crystalline phase as much as possible at a high purity and, if possible, comprises the single phase. It does not matter, however, if it is a mixture containing a small amount of unavoidable amorphous and other crystalline phases so far as they are contained within the limits that do not deteriorate the properties. As the result of investigations of the present inventors indicate, at least 90% by mass or more of β type Sialon should preferably be included. If β type Sialon is less than 90% by mass, then the fluorescence emission property is undesirably lowered.

The β type Sialon fluorescent substance of the present invention to be applied to a white LED should preferably be in the form of a powder having an average particle size of 1 to 20 μm. If the average particle size is less than 1 μm, then light absorption efficiency by scattering may be lowered and uniform dispersion over a resin sealing the LED may become difficult. If the average particle size exceeds 20 μm, variations in luminescence intensity and color tone may undesirable be created.

In the present invention, it has been found that the z value for β type Sialon if it is 0.24 to 0.42 allows, for the reason that has not yet been clear, to obtain a powder whose average particle size is 1 to 20 μm by relatively easy crushing.

Next, the method of obtaining a β type Sialon fluorescent substance according to the present invention is illustrated.

Its raw materials may be those used in the known process, e.g., silicon nitride ($Si_3N_4$), aluminum nitride (AlN), silicon oxide ($SiO_2$) and/or aluminum oxide ($Al_2O_3$), and further a Eu compound selected from metal, oxide, carbonate, nitride and oxy-nitride of Eu. Their reaction products are compounded to form a desired β type Sialon composition. Then, the amounts of oxides contained in silicon nitride and aluminum nitride powders are also taken into account.

In mixing the above-mentioned starting materials together, a dry mixing process or a process in which wet mixing is effected in an inert solvent not substantially reacting with the source components and the solvent is thereafter removed may be employed. Especially, from the standpoint of uniformly mixing the raw materials, wet mixing using an organic solvent is preferred and further since the vapor pressure is relatively low so that the operation is easily run, wet mixing in a polar solvent using such as ethyl or methyl alcohol or acetone is also preferred. As the device for mixing, use is conveniently made of a V-type mixer, rocking mixer, ball mill or vibrating mill.

A mixed powder of the raw materials after drying as needed is loaded in a container such as crucible of which at least surfaces for contact with the raw materials are made of boron nitride and heated in a nitrogen atmosphere to obtain β type Sialon by causing reactions in solid solution in the source powders to proceed. Loading the container with the source powder mixture from the standpoint of restraining interparticle sintering during the solid solution reactions is preferably to be as voluminous as possible. Specifically, the source powder mixture loaded in the container should preferably have a bulk density of not more than 0.4 g/cm$^3$. Here, the bulk density referred to is a density of the weight of source powders divided by the volume that relevant source powders occupy and does not include a binder or pore-forming material if included to disappear before synthesis.

While the temperature at which the heating is effected varies depending on the composition and cannot be defined unconditionally, it is preferably in a range not less than 1820° C. and not more than 2200° C. If the heating temperature, i.e., the synthesis temperature is less than 1820° C., Eu cannot be dissolved in solid solution into the β type Sialon crystal structure. If it is more than 2200° C., an extremely high nitrogen pressure is required to restrain decomposition of the raw materials and β type Sialon and is therefore unsuitable industrially.

The β type Sialon which as synthesized is agglomerate is applied to various uses upon crushing or pulverization in combination with classification as the case may be into a desired particle size. For use as a fluorescent substance for a white LED, it should have an average particle size of 1 to 20 µm. This concludes the making of a β type Sialon fluorescent substance in accordance with the present invention.

While as regards the crushing or pulverizing treatment mentioned above, the agglomerate of β type Sialon of a particular composition according to the present invention has the feature that it excels in pulverizability or crushability and can readily be powdered into a desired particle size by a crusher such as mortar. The crusher may naturally be a ball, vibrating or jet mill as is typically used.

Example 1

The present invention will hereinafter be described in further detail with reference to Examples and Comparative Examples.

In Example 1, a source powder was made in a formulated composition of 94.66% by mass of silicon nitride powder (made by Denki Kagaku Kogyo, KK; NP200 grade; containing 1.3% by mass of oxygen), 3.55% by mass of aluminum nitride powder (made by Tokuyama Corp.; H grade; containing 0.9% by mass of oxygen), 0.99% by mass of aluminum oxide powder (made by Taimei Chemical Co., Ltd.; TM-DAR grade), and 0.80% by mass of europium oxide powder (made by Shin-Etsu Chemical Co., Ltd.; RU grade). The formulated composition was made where impurity oxygen components in silicon nitride and aluminum nitride existed as silicon dioxide and aluminum oxide and so that as indicated in Table 1 below, the z value after synthesis was 0.3. Then, Eu content was 0.09% by atom.

TABLE 1

| | Z Value | Eu Content (% by atom) | Mixing Composition (% by mass) | | | |
|---|---|---|---|---|---|---|
| | | | $Si_3N_4$ | AlN | $Al_2O_3$ | $Eu_2O_3$ |
| Ex. 1 | 0.3 | 0.09 | 94.66 | 3.55 | 0.99 | 0.8 |
| Ex. 2 | 0.25 | 0.09 | 95.32 | 3.33 | 0.34 | 0.81 |
| Ex. 3 | 0.4 | 0.09 | 92.96 | 4.03 | 2.23 | 0.79 |
| Ex. 4 | 0.3 | 0.14 | 94.23 | 3.53 | 0.98 | 1.26 |

TABLE 1-continued

| | Z Value | Eu Content (% by atom) | Mixing Composition (% by mass) | | | |
|---|---|---|---|---|---|---|
| | | | $Si_3N_4$ | AlN | $Al_2O_3$ | $Eu_2O_3$ |
| Ex. 5 | 0.3 | 0.19 | 93.84 | 3.52 | 0.98 | 1.66 |
| C. Ex. 1 | 0.5 | 0.09 | 91.29 | 4.48 | 3.46 | 0.77 |
| C. Ex. 2 | 0.3 | 0 | 95.42 | 3.55 | 0.99 | 0 |
| C. Ex. 3 | 0.3 | 0.32 | 92.79 | 3.48 | 0.97 | 2.76 |

The source powder formulated as above was mixed together by wet ball milling in ethanol solvent with a plastic pot and silicon nitride balls, followed by filtering and drying, to obtain a mixed powder.

Next, about 100 g of the mixed powder was loaded into a boron nitride crucible having an inner diameter of 100 mm and a height of 80 mm so that it had a bulk density of 0.20 g/cm$^3$. The bulk density here is a density of the weight of source powders divided by the volume that relevant source powders occupy and does not include a binder or pore-forming material if included to disappear before synthesis.

The loaded crucible was covered with a boron nitride lid and put in an electric furnace with a carbon heater to heat-treat the powder in a pressurized nitrogen atmosphere at 1900° C. for 2 hours. The specimen synthesized was crushed using an agate mortar until it passed a sieve of 75 µm aperture to make a β type Sialon phosphor powder.

Example 2

A β type Sialon phosphor powder of Example 2 (see Table 1) was prepared in the same manner as in Example 1 except that a source powder was made in a formulated composition of 95.32% by mass of silicon nitride powder, 3.33% by mass of aluminum nitride powder, 0.34% by mass of aluminum oxide powder and 0.81% by mass of europium oxide powder such that the z value after synthesis was 0.25.

Example 3

A β type Sialon phosphor powder of Example 3 (see Table 1) was prepared in the same manner as in Example 1 except that a source powder was made in a formulated composition of 92.96% by mass of silicon nitride powder, 4.03% by mass of aluminum nitride powder, 2.23% by mass of aluminum oxide powder and 0.79% by mass of europium oxide powder such that the z value after synthesis was 0.4.

Example 4

A β type Sialon phosphor powder of Example 4 (see Table 1) was prepared in the same manner as in Example 1 except that a source powder was made in a formulated composition of 94.23% by mass of silicon nitride powder, 3.53% by mass of aluminum nitride powder, 0.98% by mass of aluminum oxide powder and 1.26% by mass of europium oxide powder such that the z value after synthesis was 0.3. Then, the Eu content was 0.14% by atom.

Example 5

A β type Sialon phosphor powder of Example 5 (see Table 1) was prepared in the same manner as in Example 1 except that a source powder was made in a formulated composition of 93.84% by mass of silicon nitride powder, 3.52% by mass of aluminum nitride powder, 0.98% by mass of aluminum oxide powder and 1.66% by mass of europium oxide powder such that the z value after synthesis was 0.3. Then, the Eu content was 0.19% by atom.

Mention is next made of Comparative Examples.

Comparative Example 1

A β type Sialon phosphor powder of Comparative Example 1 (see Table 1) was prepared in the same manner as in Example 1 except that a source powder was made in a formulated composition of 91.29% by mass of silicon nitride powder, 4.48% by mass of aluminum nitride powder, 3.46% by mass of aluminum oxide powder and 0.77% by mass of europium oxide powder such that the z value after synthesis was 0.5. Then, the Eu content was 0.09% by atom.

Comparative Example 2

A β type Sialon phosphor powder of Comparative Example 2 (see Table 1) was prepared in the same manner as in Example 1 except that a source powder was made in a formulated composition of 95.42% by mass of silicon nitride powder, 3.55% by mass of aluminum nitride powder, and 0.99% by mass of aluminum oxide powder without incorporating europium oxide powder such that the z value after synthesis was 0.3.

Comparative Example 3

A β type Sialon phosphor powder of Comparative Example 3 (see Table 1) was prepared in the same manner as in Example 1 except that a source powder was made in a formulated composition of 92.79% by mass of silicon nitride powder, 3.48% by mass of aluminum nitride powder, 0.97% by mass of aluminum oxide powder and 2.76% by mass of europium oxide powder so that the z value after synthesis was 0.3. Then, the Eu content was 0.32% by atom.

Mention is made of a method of measuring properties of Examples 1 to 5 and Comparative Examples 1 to 3.

Powder X-ray diffraction measurement (XRD) using a Kα line of Cu was performed for the synthesized powders of Examples 1 to 5 and Comparative Examples 1 to 3 to identify their crystalline phases, quantitatively analyze the crystalline phases in the Rietveld method and measure the lattice constants of β type Sialon. The average particle size was obtained by particle size distribution measurement using a laser scattering method. Results of the powder X-ray diffraction measurement (XRD), average particle sizes, peak emission intensities at blue light (wavelength of 460 nm) excitation and CIE 1931 chromaticity values are shown in Table 2. Peak intensity here is shown in arbitrary unit as it varies depending on the measurement apparatus and conditions, and the Examples of the present Invention and the Comparative Examples are compared as measured under the same conditions.

TABLE 2

| | XRD | | | | Fluorescence Properties (460 nm Exct.) | |
|---|---|---|---|---|---|---|
| | Crystal. Phase | Lattice | | | | |
| | (Content = % by mass) | Const. (Å) | | Average Diameter (μm) | Intensity Arbitrary Unit | CIE1931 Chromaticity |
| | | a | c | | | x | y |
| Ex. 1 | β 100) | 7.613 | 2.913 | 10 | 563 | 0.33 | 0.64 |
| Ex. 2 | β 100) | 7.61 | 2.911 | 8 | 468 | 0.31 | 0.65 |
| Ex. 3 | β 100) | 7.614 | 2.915 | 13 | 557 | 0.34 | 0.64 |
| Ex. 4 | β 100) | 7.613 | 2.912 | 12 | 520 | 0.34 | 0.63 |
| Ex. 5 | β (95), α (5) | 7.612 | 2.912 | 12 | 460 | 0.35 | 0.62 |
| C. Ex. 1 | β 100) | 7.618 | 2.918 | 25 | 403 | 0.35 | 0.62 |
| C. Ex. 2 | β 100) | 7.612 | 2.912 | 7 | — | — | — |
| C. Ex. 3 | β (88), α (12) | 7.613 | 2.912 | 18 | 243 | 0.38 | 0.59 |

It has been found that the product of Example 1 as shown in Table 2 is a single phase β type Sialon (100% by mass). It has lattice constants: a=7.613 Å and c=2.913 Å which are a little larger than those of β type silicon nitride (a=7.604 Å and c=2.908 Å). The average particle size was 10 μm. Also, green light emission of fluorescence intensity of 563 (in arbitrary scale) and CIE 1931 chromaticity: x=0.33 and y=0.64 was shown created by 460 nm excitation light.

The product of Example 2 as shown in Table 2 has been found to be a single phase β type Sialon. It has lattice constants: a=7.610 Å and c=2.911 Å which are a little larger than those of β type silicon nitride. The average particle size was 8 μm. Also, green light emission of fluorescence intensity of 468 (in arbitrary scale) and CIE 1931 chromaticity: x=0.31 and y=0.65 was shown created by 460 nm excitation light.

The product of Example 3 as shown in Table 2 has been found to be a single phase β type Sialon. It has lattice constants: a=7.614 Å and c=2.915 Å which are a little larger than those of β type silicon nitride. The average particle size was 13 μm. Also, green light emission of fluorescence intensity of 557 (in arbitrary scale) and CIE 1931 chromaticity: x=0.34 and y=0.64 was shown created by 460 nm excitation light.

The product of Example 4 as shown in Table 2 has been found to be a single phase β type Sialon. It has lattice constants: a=7.613 Å and c=2.912 Å which are a little larger than those of β type silicon nitride. The average particle size was 12 μm. Also, green light emission of fluorescence intensity of 520 (in arbitrary scale) and CIE 1931 chromaticity: x=0.34 and y=0.63 was shown created by 460 nm excitation light.

The product of Example 5 as shown in Table 2 has been found to have a composition comprising a β type and an α type Sialon by 95 and 5% by mass, respectively. It has lattice constants: a=7.612 Å and c=2.912 Å which are a little larger than those of β type silicon nitride. The average particle size was 12 μm. Also, green light emission of fluorescence intensity of 460 (in arbitrary scale) and CIE 1931 chromaticity: x=0.35 and y=0.62 was shown created by 460 nm excitation light.

As above, all the products of Examples 1 to 5 contain in crystalline phase 90% by mass or more of β type Sialon and show lattice constants which are a little larger than those of β type silicon nitride. Also, they all are excellent in crushability and can readily be crushed by mortar into powder of average particle sizes of 8 to 13 μm. Further, they all were appraised to show the CIE 1931 chromaticity: x=0.31 to 0.35 and y=0.62 to 0.65 for green light emissions.

It has been found that the product of Comparative Example 1 as shown in Table 2 is a single phase β type Sialon. It has lattice constants: a=7.618 Å and c=2.918 Å which are a little larger than those of β type silicon nitride. The synthesized product here of Comparative Example 1 had its interparticle sintering advanced, was poor in crushability and showed a large value of 25 μm in average particle size as a result of that it was roughly crushed by a stamping mill and pulverized by a mortar into powder particles and the particles were passed through a sieve having an aperture of 75 μm. From observation of the synthetic powder by a scanning electron microscope, it has been found that acicular particles having a particle size of 1 to 5 μm and an aspect ratio of 5 to 10 are intertwined forming secondary particles. While green light emission of fluorescence intensity of 403 (in arbitrary scale) and CIE 1931 chromaticity: x=0.35 and y=0.62 was shown created by 460 nm excitation light, the luminous intensity was found to be lower in value than those in Examples 1 to 5.

The product of Comparative Example 2 as shown in Table 2 has been found to be a single phase β type Sialon. It has lattice constants: a=7.612 Å and c=2.912 Å which are a little larger than those of β type silicon nitride. Further, the product of Comparative Example 2 not containing Eu did not emit light at all when excited by light ranging in wavelength between 200 and 500 nm.

The product of Comparative Example 3 as shown in Table 2 has been found to have a composition consisting of 88% by mass of type Sialon and 12% by mass of a type Sialon. It has lattice constants: a=7.613 Å and c=2.912 Å which are a little larger than those of β type silicon nitride. While a fluorescence intensity of 243 (in arbitrary scale) was shown created by 460 nm excitation light, the luminous intensity was found to be lower in value than those in Examples 1 to 5. Further, It had CIE 1931 chromaticity: x=0.38 and y=0.596, showing a shift towards the red color side. This shift of CIE 1931 chromaticity towards the red color side is inferred to occur because Eu in part is consumed to form α type Sialon reducing its proportion of solid solution into β type Sialon to lower the emission intensity largely and because of yellow to orange color emission of α type Sialon having Eu dissolved in solid solution.

Excitation spectra and fluorescence spectra by external excitation light in the Examples and the Comparative Examples are appraised using a fluorescence spectrometer.

FIG. 1 is a diagram illustrating an excitation spectrum when a fluorescent intensity at 535 nm was measured of a β type Sialon powder and an emission spectrum by external excitation light at a wavelength of 460 nm in Example 1. In the diagram, the abscissa axis (nm) represents wavelength of excitation light for the excitation spectrum and emission wavelength for the emission spectrum by the external excitation light while the ordinate axis represents emission intensity (in arbitrary scale).

As is apparent from FIG. 1, it is seen that according to the excitation spectrum of the β type Sialon powder in Example 1, an intense emission was obtained with broad excitation light of 250 to 500 nm. Further, it is seen that when excited by external light of a wavelength of 460 nm, it exhibits an emission that is intense in luminous strength having a peak for green color light at 538 nm.

It has further been found that excitation spectra and emission spectra by external excitation light as in Example 1 are obtained in Examples 2 to 4.

In Comparative Example 1, an excitation spectrum and an emission spectrum by external excitation light were obtained which were as in but weaker in luminous intensity than in Examples 1 to 5.

In contrast, Comparative Example 3 was markedly weaker in luminous intensity than Comparative Example 1 failed to emit green light since the emission wavelength by excitation light at 460 nm shifted in chromaticity towards the red color side due to yellow to orange light emission of a type Sialon having Eu dissolved in solid solution.

According to β type Sialon fluorescent substances in Examples 1 to 5, light from InGaN family blue LED (450 to 500 nm) can be utilized as excitation light and light from InGaN family blue LED (350 to 500 nm) can be used as excitation light to emit green color light high in intensity. To this end, as a light source for a β type Sialon fluorescent substance, a blue or ultraviolet light emitting diode can be used, possibly in combination with a phosphor emitting yellow or red light, to realize a white LED that is excellent in luminous property.

Example 6

Mention is made of an embodiment of such white LED using a combination of a β type Sialon powder in the Examples above with a blue LED.

A blue LED having an emission wavelength of 460 nm was used as an excitation light source. A blue LED chip was disposed at the bottom of a surface mounting LED package and electrode parts in the blue LED chip and the package were electrically connected together by wire bonding.

As fluorescent substances, a β type Sialon fluorescent substance as the green phosphor in Example 1, an α type Sialon fluorescent substance as a yellow phosphor (see Patent Reference 2) and a $Ca_2Si_5N_8$ fluorescent substance (see Non-patent Reference 1) as a red phosphor were sampled so as to be of 10 g in total and mixed together to obtain a phosphor mixture.

Then, a dosage of the phosphor mixture was mixed and kneaded with 10 g of an epoxy resin (made by Sanyu-Rec Co., Ltd.; NLD-SL-2101).

Finally, the epoxy resin having the phosphor mixture kneaded therein was dropped on the blue LED chip having the wire bonding applied thereto, and was degassed in vacuum and heat-hardened at 110° C., namely having a potting treatment applied thereto to prepare a surface mounting LED of Example 6.

The proportion at which the three fluorescent substances were mixed together was adjusted so that the chromaticity of the LED measured as will be described later falls in the warm white (WW) standard defined in JIS Z 9112 (hereinafter also referred to as "WW standard").

Example 7

A white LED of Example 7 was prepared in the same manner as in Example 6 except that the β type Sialon fluorescent substance of Example 3 was used.

Mention is made of a Comparative Example to Examples 6 and 7.

Comparative Example 4

A white LED of Comparative Example 4 was prepared in the same manner as in Example 6 except that the β type Sialon fluorescent substance of Comparative Example 1 was used.

Mention is made of emission properties of the white LEDs of Examples 6 and 7 and Comparative Example 4.

Each LED had a forward current of 10 mA passed through it and its chromaticity was measured. A LED of which the chromaticity met with the WW standard was sorted. Results of measurement of the lamp efficiency and the general color rendering index of a white LED are shown in Table 3 below.

The general color rendering index is an average value of measurements of a plurality of white LEDs.

As is apparent from Table 3, it was found that the white LED of Example 6 had a lamp efficiency of 25.1 μm/W and a general color rendering index of 86.

The white LED of Example 7 had a lamp efficiency of 24.8 μm/W and a general color rendering index of 87.

On the other hand, the white LED of Comparative Example 4 had a lamp efficiency of 21.5 μm/W and a general color rendering index of 85.

TABLE 3

|  | β type Sialon Phosphor | Lamp efficiency (lm/W) | General Color Rendering Index |
|---|---|---|---|
| Example 6 | Example 1 | 25.1 | 86 |
| Example 7 | Example 3 | 24.8 | 87 |
| Com. Ex. 4 | Com. Ex. 1 | 21.5 | 85 |

In the measurements above, it has been found that the white LEDs of Examples 6 and 7 are higher in lamp efficiency than the white LED of Comparative Example 4 using the β type Sialon fluorescent substance of Comparative Example 1. From this, it has been known that the lamp efficiency of a white LED here depends on the fluorescent characteristic intensity of a β type Sialon fluorescent substance shown in Table 2.

As a result of the preceding, it has been found that a β type Sialon fluorescent substance of the present invention can be used with a blue LED as an excitation light source in combination with fluorescent substances emitting yellow and red light to realize a white LED that is high in both lamp efficiency and general color rendering index. It has also been confirmed that a variety of luminescent colors can be obtained by changing the proportion of the three fluorescent substances. For examples, a white color and an incandescent lamp color can be obtained.

Example 8

Mention is made of Examples of the white LED using β type Sialon powders of the Examples as a phosphor of the violet LED.

As the excitation light source, use was made of a violet LED having an emission wavelength of 400 nm. As fluorescent substances, a β type Sialon fluorescent substance as the green phosphor in Example 1, a $BaMgAl_{19}O_{17}:Eu$ fluorescent substance on the market as a blue phosphor, an α type Sialon fluorescent substance as a yellow phosphor (see Patent Reference 2) and a $Ca_2Si_5N_8$ fluorescent substance (see Non-patent Reference 1) as a red phosphor were sampled so as to be of 10 g in total and mixed together to obtain a phosphor mixture. A violet LED was mounted on a package, the phosphor mixture is mixed and kneaded with an epoxy resin and the latter having the phosphor mixture was applied in the same manner as in Example 6 to prepare a white LED of Example 8.

The proportion at which the four fluorescent substances were mixed together was adjusted so that the chromaticity of the LED measured as in Example 6 falls in the warm white (WW) standard defined in JIS Z 9112.

Example 9

A white LED of Example 9 was prepared in the same manner as in Example 8 except that the β type Sialon fluorescent substance of Example 3 was used.

Mention is made of a Comparative Example to Examples 8 and 9.

Comparative Example 5

A white LED of Comparative Example 5 was prepared in the same manner as in Example 8 except that the β type Sialon fluorescent substance of Comparative Example 1 was used.

Mention is made of emission properties of the white LEDs of Examples 8 and 9 and Comparative Example 5.

Each LED had a forward current of 10 mA passed through it and its chromaticity was measured. A LED of which the chromaticity met with the WW standard was sorted. Results of measurement of the lamp efficiency and general color rendering index of a white LED are shown in Table 4 below.

As is apparent from Table 4, it was found that the white LED of Example 8 had a lamp efficiency of 20.3 μm/W and a general color rendering index of 91.

The white LED of Example 9 had a lamp efficiency of 20.1 μm/W and a general color rendering index of 92.

On the other hand, the white LED of Comparative Example 5 had a lamp efficiency of 18.7 lm/W and a general color rendering index of 90.

TABLE 4

|  | β type Sialon Phosphor | Lamp efficiency (lm/W) | General Color Rendering Index |
|---|---|---|---|
| Example 8 | Example 1 | 20.3 | 91 |
| Example 9 | Example 3 | 20.1 | 92 |
| Com. Ex. 5 | Com. Ex. 1 | 18.7 | 90 |

It has been found that the white LEDs in Examples 8 and 9 using the β type Sialon fluorescent substances of Examples 1 and 3 are higher in lamp efficiency than the white LED in Comparative Example 5. From this result, it has been known that the lamp efficiency of a white LED here as in Examples 6 and 7 and Comparative Example 4 depends on the fluorescent characteristic intensity of a β type Sialon fluorescent substance shown in Table 2.

From the preceding, it has been found that a β type Sialon fluorescent substance of the present invention can be used with a violet LED as an excitation light source in combination with fluorescent substances emitting yellow, red and blue light to realize a white LED that is high in both lamp efficiency and general color rendering index. It has also been confirmed that a variety of luminescent colors can be obtained by changing the proportion of the four fluorescent substances. For examples, a white color and an incandescent lamp color have been obtained.

INDUSTRIAL APPLICABILITY

A β type Sialon fluorescent substance of the present invention which can be excited by a broad range of wavelengths from ultraviolet to blue light to emit green light high in brightness can be properly used as a white LED phosphor using blue or ultraviolet light as a light source, and also for lighting equipments and image display units.

Further, a β type Sialon fluorescent substance of the present invention is of the property that if exposed to elevated temperature, it does not deteriorate and therefore if applied to the field of lighting equipment and image display units, can exhibit its properties of excelling in heat resistance and stability over an extended period of time in an oxidative atmosphere and under a moisture environment, and it is industrially very useful.

What is claimed is:

1. A β type Sialon fluorescent substance comprising a β type Sialon composition represented by general formula: $Si_{6-z}Al_zO_zN_{8-z}$ as a host material in which Eu is contained dissolved in solid solution as a luminescent center, wherein:
z in the composition of the general formula is not less than 0.24 and not more than 0.42 and Eu is present at a content of 0.05 to 0.25% by atom.

2. The β type Sialon fluorescent substance as set forth in claim 1, wherein the β type Sialon composition containing Eu dissolved in solid solution is present at a content of at least 90% by mass or more.

3. The β type Sialon fluorescent substance as set forth in claim 1, wherein the β type Sialon fluorescent substance is in the form of a powder having an average particle size of not less than 1 μm and not more than 20 μm.

4. The β type Sialon fluorescent substance as set forth in claim 2, wherein the β type Sialon fluorescent substance is in the form of a powder having an average particle size of not less than 1 μm and not more than 20 μm.

5. The β type Sialon fluorescent substance as set forth in claim 1, wherein a green light emission of the β type Sialon fluorescent substance created by 460 nm excitation light has a CIE 1931 chromaticity: x=0.33 and y=0.64.

6. The β type Sialon fluorescent substance as set forth in claim 1, wherein a green light emission of the β type Sialon fluorescent substance created by 460 nm excitation light has a CIE 1931 chromaticity: x=0.31 and y=0.65.

7. The β type Sialon fluorescent substance as set forth in claim 1, wherein a green light emission of the β type Sialon fluorescent substance created by 460 nm excitation light has a CIE 1931 chromaticity: x=0.34 and y=0.64.

8. The β type Sialon fluorescent substance as set forth in claim 1, wherein a green light emission of the β type Sialon fluorescent substance created by 460 nm excitation light has a CIE 1931 chromaticity: x=0.34 and y=0.63.

9. The β type Sialon fluorescent substance as set forth in claim 1, wherein a green light emission of the β type Sialon fluorescent substance created by 460 nm excitation light has a CIE 1931 chromaticity x=0.35 and y=0.62.

* * * * *